US012724896B2

(12) United States Patent
G et al.

(10) Patent No.: US 12,724,896 B2
(45) **Date of Patent: *Sep. 1, 2026**

(54) METHODS, SYSTEMS, ARTICLES OF MANUFACTURE AND APPARATUS TO UPDATE TRIM VALUES OF A DEVICE

(71) Applicant: Texas Instruments Incorporated, Dallas, TX (US)

(72) Inventors: Anand Kumar G, Bengaluru (IN); Veeramanikandan Raju, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 22 days.

This patent is subject to a terminal disclaimer.

(21) Appl. No.: 18/434,248

(22) Filed: Feb. 6, 2024

(65) Prior Publication Data

US 2025/0252187 A1 Aug. 7, 2025

(51) Int. Cl.

| | |
|---|---|
| ***G06F 21/57*** | (2013.01) |
| ***G06F 12/123*** | (2016.01) |
| ***G06F 21/54*** | (2013.01) |

(52) U.S. Cl.
CPC .......... *G06F 21/572* (2013.01); *G06F 12/123* (2013.01); *G06F 21/54* (2013.01)

(58) Field of Classification Search
CPC ....... G06F 21/572; G06F 12/123; G06F 21/54
See application file for complete search history.

(56) References Cited

U.S. PATENT DOCUMENTS

| | | | | |
|---|---|---|---|---|
| 11,328,066 | B2 * | 5/2022 | Dahiya ............... | G06F 12/0646 |
| 12,158,804 | B1 | 12/2024 | Zwerg et al. | |
| 12,189,471 | B2 * | 1/2025 | G ........................ | G06F 11/1004 |
| 2023/0138906 | A1 | 5/2023 | Hoel et al. | |

* cited by examiner

*Primary Examiner* — Hadi S Armouche
(74) *Attorney, Agent, or Firm* — Carl G. Peterson; Frank D. Cimino

(57) ABSTRACT

An example apparatus includes instructions and programmable circuitry configurable to at least one of instantiate or execute the instructions to authenticate a request to update a first trim value to a second trim value, wherein the first trim value is stored in a memory. The example apparatus also includes instructions to, in response to authentication of the request, store the second trim value to the memory while the first trim value remains stored in the memory.

20 Claims, 7 Drawing Sheets

METHODS, SYSTEMS, ARTICLES OF MANUFACTURE AND APPARATUS TO UPDATE TRIM VALUES OF A DEVICE

TECHNICAL FIELD

This description relates generally to electrical components and, more particularly, to methods, systems, articles of manufacture and apparatus to update trim values of a device.

BACKGROUND

Electronic devices may be deployed in diverse environments to facilitate system operations related to radio frequency (RF) power transmission, RF reception, oscillator frequency control, etc.

SUMMARY

For methods, systems, articles of manufacture, and apparatus to update trim values of a device, an example apparatus includes instructions and programmable circuitry configurable to at least one of instantiate or execute the instructions to authenticate a request to update a first trim value to a second trim value, wherein the first trim value is stored in a memory. The example apparatus also includes instructions to, in response to authentication of the request, store the second trim value to the memory while the first trim value remains stored in the memory.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
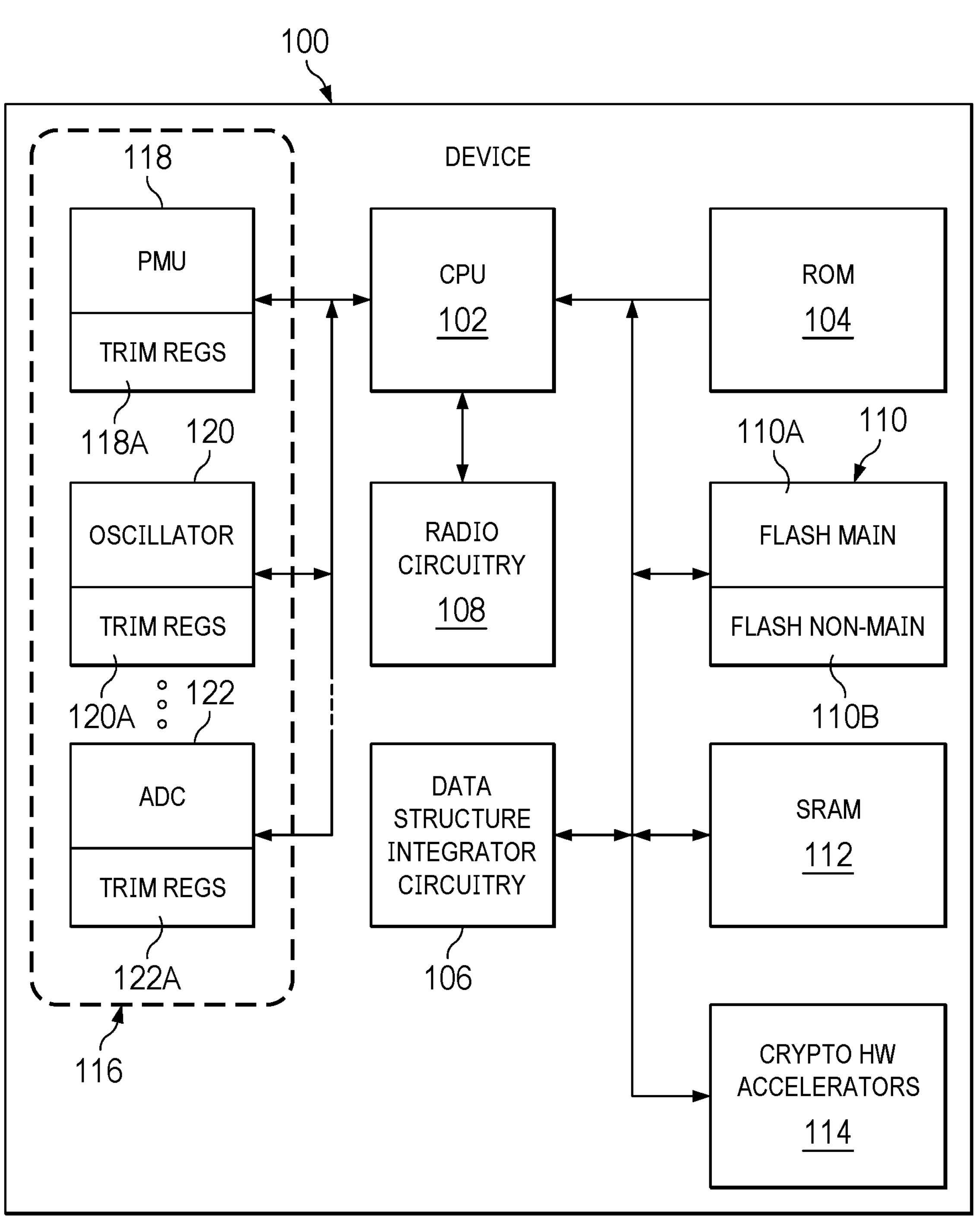
FIG. 1 is a block diagram of an example device including peripherals that use trim values, in which a data structure integrator operates to update trim values of the device.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Devices produced by a manufacturer and deployed into an operating environment (e.g., sometimes referred to as "in the field") are expected to perform in a consistent and reliable manner. In some examples, devices are subjected to a laboratory test at or near the end of a manufacturing process and/or assembly process to set operating parameters, referred to herein as "trim values." Depending on the type of device, corresponding trim values exhibit different effects on the device. For instance, a radio frequency (RF) transmitter in a power amplifier device may have a first trim value (e.g., a transmission trim value) that sets a particular RF power level during operation, and an RF receiver in the power amplifier device may have a second trim value (e.g., a receiver trim value) that sets a particular receiving sensitivity during operation. In some examples, a resistive/capacitive (RC) oscillator device exhibits particular operating frequencies based on a trim value, but examples include any other type of device that has one or more trim values to aid in operating characteristics.

End users and/or original equipment manufacturers (OEMs) of devices may expect particular trim values to be operational upon receipt and deployment in particular operating environments. As such, the OEM designs circuits, system-on-chip (SoC) assemblies, and/or systems in a manner that performs tasks consistent with end-use application specifications that rely upon static trim values that were established by the manufacturer. However, in some examples the OEM application may change, which elicits a potential need to either source (e.g., purchase) alternate devices that perform to changed circumstances, or design costly fixes to the end-use application. In some examples, the OEM application changes based on environmental changes (e.g., temperature changes, proximity placement changes, etc.) that have occurred since an initial installation of the device in the operating environment. To illustrate, in the event a power amplifier is located in a first location at a first time the transmitter power level established by a first trim value may be appropriate for an end-user application. However, in the event the power amplifier is relocated to a second location at a second time, the transmitter power level may be either too high or too low, thereby causing transmission errors and/or transmission performance that no longer meets quality of service (QOS) expectations. To remedy the changed circumstances of the device (e.g., the power amplifier) in the field, a new power amplifier may need to be requested from the manufacturer with alternate trim values that are appropriate for the new (e.g., second) location.

Device trimming subject matter is discussed in U.S. Patent Application Publication No. 2023/0138906 A1 filed on Dec. 30, 2021 and U.S. application Ser. No. 18/345,449 filed on Jun. 30, 2023. The entireties of U.S. Patent Application Publication No. 2023/0138906 A1 and U.S. application Ser. No. 18/345,449 are incorporated by reference herein.

Known devices do not include trim updating mechanisms and/or techniques after the device boots in the field. For instance, after device manufacturing, one or more test programs store trim values in a memory of the device (e.g., a flash memory). After a boot process of the device (e.g., a cold boot) or a device reset condition, the memory is locked so that trim data cannot be read, modified and/or erased by an application. Additionally, locations corresponding to registers in which trim values are set are not disclosed to end users, OEMs and/or reference manuals of the device. As such, OEMs will not have any knowledge of trim modifications to the device after the device is installed in the field.

Example described herein enable over the air (OTA) updates of trim values (e.g., firmware update over the air (FOTA)) by OEMs when the device is operational and/or otherwise already installed in the field. Examples described herein enable trim updates (e.g., updates to trim values and/or updates to trim data structures that contain trim values for one or more peripherals) by OEMs in a manner that ensures security through authentication, and enables reliability through testing of updated trim values before device use. As described further herein, the performance, functionality, and/or efficiency of a peripheral can improve after updating a trim value associated with that peripheral. After updating a trim value in a device, the device may be better adapted to an environment, situation, or network parameters.

FIG. 1 is a block diagram of an example device 100 including one or more peripherals that utilize trim values. In the illustrated example of FIG. 1, the device 100 includes processor circuitry 102, read-only-memory (ROM) 104 storing boot code, and data structure integrator circuitry 106 to facilitate updating of trim values for the device 100 and/or peripherals of the device, as described in further detail below. The illustrated example of FIG. 1 also includes radio circuitry 108, non-volatile memory 110 (e.g., flash memory) having a main portion 110A and a non-main portion 110B, random access memory (RAM) 112 (e.g., static RAM-SRAM), and accelerator circuitry 114. In some examples, the accelerator circuitry 114 includes an advanced encryption standard (AES) accelerator to perform encryption and/or decryption operations. In some examples, the accelerator circuitry 114 includes a secure hash algorithm (SHA) accelerator to perform hash operations. In some examples, the accelerator circuitry 114 includes true random number generator (TRNG) circuitry. The illustrated example of FIG. 1 also includes one or more peripherals 116, such as an example power management unit (PMU) 118, an example oscillator 120, and an example analog-to-digital converter (ADC) 122. While the illustrated example of FIG. 1 includes three peripherals, examples disclosed herein are not limited thereto. Any number of peripherals may include, but are not limited to power amplifiers, low noise amplifiers, direct-current to direct-current (DCDC) converters, oscillators, ADCs, Internet-of-Things (IoT) devices, digital-to-analog (DAC) converters, operational amplifiers (OpAmps), etc. Each of the example peripherals 116 includes corresponding registers that store trim values that guide and/or otherwise instruct operations of the peripherals 116. The example PMU 118 includes PMU registers 118A, the example oscillator 120 includes oscillator registers 120A, and the example ADC 122 includes ADC registers 122A. While the illustrated example of FIG. 1 includes three example peripherals, examples described herein are not limited thereto. For instance, the illustrated example device 100 of FIG. 1 may be a system-on-chip (SoC) or a platform having any number of peripherals thereon.

In operation, the example device 100 of FIG. 1 may be deployed in an environment to perform one or more objectives that utilize the peripherals 116. In some examples, the device 100 may be located in a first location having first environmental characteristics, such as a first temperature or a first distance away from one or more other devices. In some examples, the device 100 may be stationary, but the first environmental characteristics change in a manner that causes performance degradation of the one or more objectives that the device is designed to satisfy. For instance, second environmental characteristics may include a second temperature greater than the first temperature that causes performance degradation of the device due to temperature extremes beyond one or more threshold values of the device and/or components thereof. In some examples, if the device 100 of FIG. 1 is located in a second distance at a second time further away from participating devices that communicate via the example radio circuitry 108, then the relatively greater distance may cause a greater number of communication errors (e.g., a second location at the second distance may reside in a noisy environment).

To mitigate negative effects caused by changed conditions of the example device 100, examples described herein employ the data structure integrator circuitry 106 to facilitate an ability to set alternate trim values on the device while the device is in the field. For example, in response to increased temperature characteristics, the data structure integrator circuitry 106 enables trim values of the example PMU 118 to be decreased in an effort to avoid thermal runaway conditions. In some examples, in response to increased communication errors, the example data structure integrator circuitry 106 enables a frequency setting of the example oscillator 120 may be reduced to reduce a communication bit rate.

Figure 2:
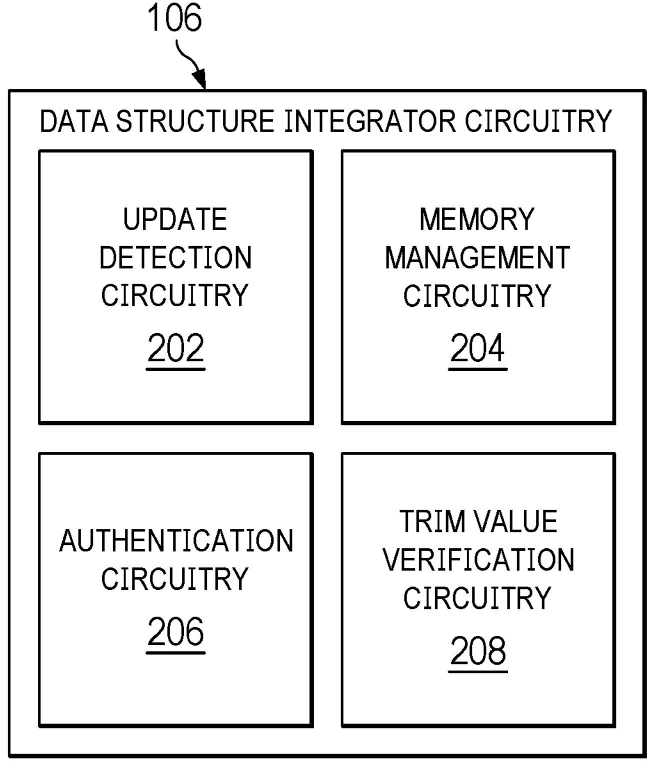
FIG. 2 is a block diagram of an example implementation of the data structure integrator of FIG. 1.

FIG. 2 is a block diagram of an example implementation of the data structure integrator circuitry 106 of FIG. 1 to do trim value updating. The data structure integrator circuitry 106 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the data structure integrator circuitry 106 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. In some examples, CPU 102 may be configurable to perform some or all of the functionality attributed to the data structure integrator circuitry 106 in this disclosure. Some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

FIG. 2 is a block diagram of the example data structure integrator circuitry 106. In the illustrated example of FIG. 2, the data structure integrator circuitry 106 includes example update detection circuitry 202, example memory management circuitry 204, example authentication circuitry 206, and example trim value verification circuitry 208. In some examples, the update detection circuitry 202 is instantiated by programmable circuitry executing update detection instructions and/or configured to perform operations such as those represented by the flowchart(s) of FIGS. 5A and 5B. In some examples, the memory management circuitry 204 is instantiated by programmable circuitry executing memory management instructions and/or configured to perform operations such as those represented by the flowchart(s) of FIGS. 5A and 5B. In some examples, the authentication circuitry 206 is instantiated by programmable circuitry executing authentication instructions and/or configured to perform operations such as those represented by the flowchart(s) of FIGS. 5A and 5B. In some examples, the trim value verification circuitry 208 is instantiated by programmable circuitry executing trim value verification instructions and/or configured to perform operations such as those represented by the flowchart(s) of FIGS. 5A and 5B.

In some examples, the data structure integrator circuitry 106 includes means for detecting updates, means for managing memory, means for authentication, and means for verifying trim values. For example, the means for detecting updates may be implemented by update detection circuitry 202, the means for managing memory may be implemented by memory management circuitry 204, the means for authentication may be implemented by authentication circuitry 206, and the means for verifying trim values may be implemented by trim value verification circuitry 208. In some examples, the update detection circuitry 202, the memory management circuitry 204, the authentication circuitry 206 and the trim value verification circuitry 208 may be instantiated by programmable circuitry such as the example programmable circuitry 612 of FIG. 6. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In operation, the example update detection circuitry 202 of FIG. 2 monitors for an occurrence of a request to update trim values of the device 100. In some examples, the update detection circuitry 202 is communicatively connected to the example radio circuitry 108 and parses incoming information that is associated with trim update requests. In some examples, trim update requests are received by the radio circuitry 108 (e.g., Bluetooth low energy (BLE)) as a data packet having header information with one or more tags indicative of a trim value change request. As such, the example update detection circuitry 202 parses packet headers for particular tags associated with the trim update request(s).

In the event the update detection circuitry 202 detects a trim update request and/or a request to update a trim value (e.g., to update and/or otherwise overwrite a first trim value to a second trim value, overwrite a second trim value with a third trim value, etc.), the example memory management circuitry 204 can store new trim values and/or a new trim data structure in the example RAM 112. However, the received trim value(s) and/or the new trim data structure is not yet stored in non-volatile memory 110 and/or otherwise allowed to change (e.g., overwrite) any current trim values because the newly received trim data structure has not yet been vetted (e.g., authenticated and/or tested to contain safe and/or otherwise functional trim values). Examples described herein will refer to receiving a trim data structure that contains any number of trim values for corresponding peripherals, but examples are not limited to that. The example authentication circuitry 206 may be configurable to perform one or more security checks on the received trim data structure (e.g., or individually received trim values). As described in further detail below, security checks may include, but are not limited to decrypting a digital signature of the data structure to generate a decrypted signature value that is compared to a hash digest. If the authentication circuitry 206 performs the comparison and determines a non-match, then the data structure is rejected from further use and/or consideration by the authentication circuitry 206. However, if the authentication circuitry 206 performs the comparison and determines a match, then the example memory management circuitry 204 stores the trim data structure in the non-volatile memory 110. As described in further detail below, the memory management circuitry 204 may store the authenticated trim data structure in a non-main portion 110B (sometimes referred to herein as a secondary memory sector), while a main portion 110A (sometimes referred to herein as a primary memory sector) is typically reserved for user applications.

While the newly received trim data structure may be successfully authenticated by the example authentication circuitry 206, the example trim value verification circuitry 208 may be configurable to determine whether one or more of the trim values within the newly received trim data structure is safe and/or otherwise appropriate for use with the one or more peripherals 116. In some examples, one or more of the newly received trim values are tested with one or more of the respective peripherals 116. For instance, if the peripheral is a power amplifier (PA) or a low noise amplifier (LNA), one or more RF loop-back tests may be instantiated by the trim value verification circuitry 208. Results of the RF loop-back tests may then be compared against one or more threshold values. In some examples, if the peripheral is an ADC with new trim values corresponding to an ADC resolution, the example trim value verification circuitry 208 performs an ADC conversion (e.g., as part of a linearity test) using the new trim value(s) to confirm if output values of the ADC are updated and/or otherwise correct. In some examples, if the peripheral is a clock module (CKM), the trim value verification circuitry 208 tests new trim values to verify that they adjust a clock frequency by, for instance, using a time-to-digital converter (TDC) (e.g., a TDC on-chip with an SoC). Stated differently, the example trim value verification circuitry 208 performs any number of tests using the newly received trim values to verify that such values are tested to satisfy one or more target metrics, and that such values do not break and/or otherwise disrupt proper operation of the one or more peripherals that are to be reconfigured with the new trim values that overwrite existing trim values that may be in one or more registers.

In the event the example trim value verification circuitry 208 determines that a trim value test fails, then the received trim data structure (or a trim value) is rejected from further consideration and/or use by the device 100 and/or peripherals 116 of the device 100. Stated differently, trim values and/or trim data structures that to not satisfy one or more trim value tests are disabled from being used. Rather than use the newly received trim data structure and/or trim values therein, a failed test causes previous trim values to remain active (e.g., disable device usage of the second trim value and enable device usage of the first (e.g., original or prior) trim value) for the device 100. In some examples, a failed test is reported back to the OEM. However, in the event that the example trim value verification circuitry 208 determines that the trim value test is successful, then the example data structure integrator circuitry 202 may be configurable to authorize the use of the trim value(s) and causes the device 100 to reboot and use the newly received trim values stored in non-volatile memory. Stated differently, tested trim values that satisfy one or more target metrics (e.g., operational thresholds of one or more peripherals), cause that tested trim value (e.g., the newly received trim value) to be authorized for future usage, while the prior trim value is deactivated and/or otherwise prohibited from being used with the peripheral. While the new trim values are now stored in memory and implemented and/or otherwise applied to corresponding peripherals, at least one immediate prior version of the trim values and/or trim data structure is also stored in the memory. For instance, in the event a roll-back is needed, the prior version of one or more trim values and/or the prior trim data structure is still stored in the memory and may be activated.

Figure 3:
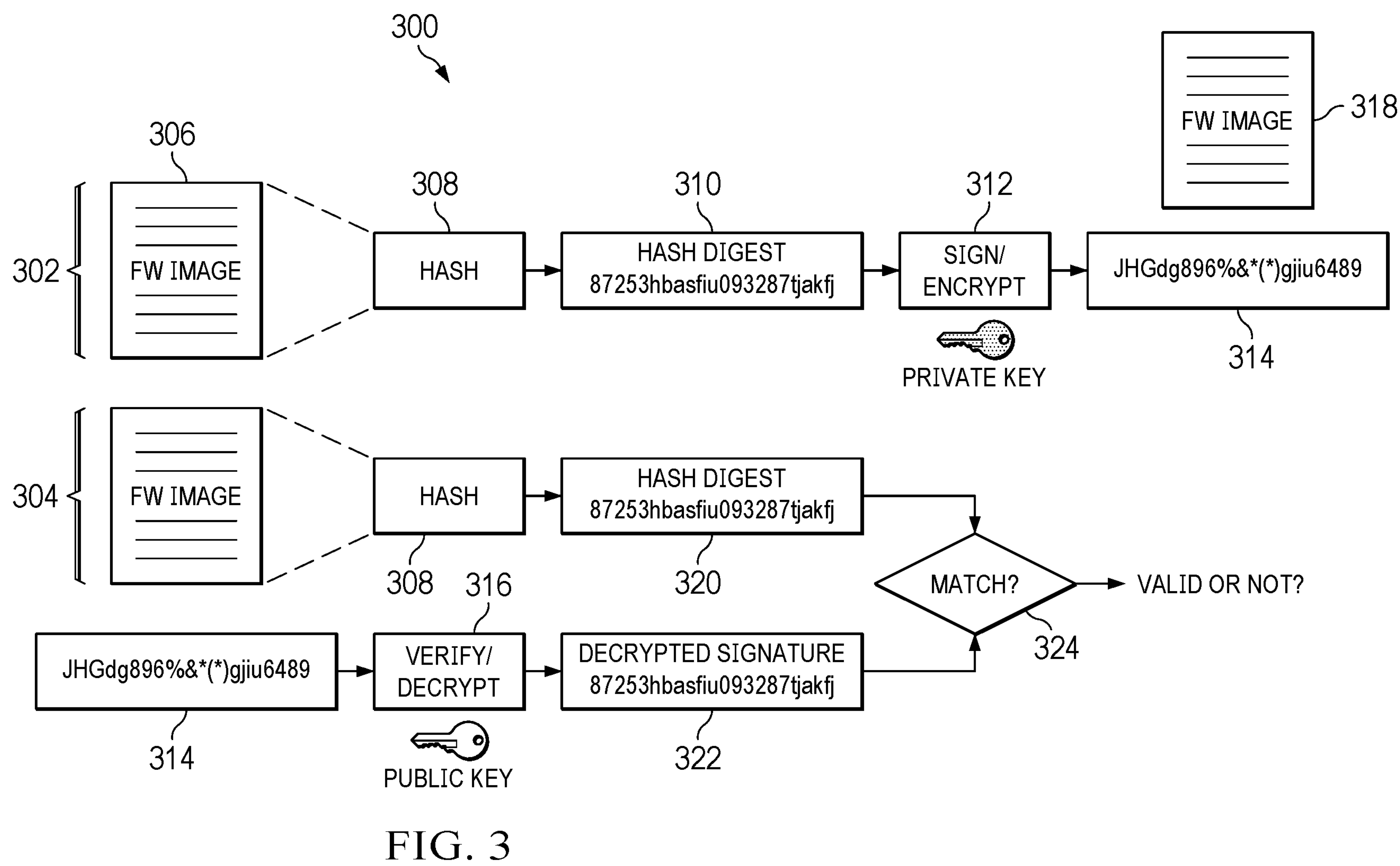
FIG. 3 is a block diagram representative of example trim data structure authentication performed by the data structure integrator of FIG. 1 performs.

FIG. 3 is a block diagram of trim data structure authentication operations 300. In the illustrated example of FIG. 3, the trim data structure authentication operations 300 include a digital signature generation operation 302 performed on a raw and/or otherwise candidate trim data structure before it is transmitted to one or more devices 100, and a digital signature verification operation 304 performed on a signed trim data structure. The example digital signature generation operation 302 includes a raw other otherwise candidate trim data structure 306 that is to be sent and/or otherwise distributed to one or more peripherals 116 of the device 100. The candidate trim data structure 306 has not yet been prepared for distribution by a trusted party, such as an OEM and/or manufacturer of the device 100. The candidate trim data structure 306 is hashed with a hashing algorithm 308 to generate a first hash digest 310. The first hash digest 310 is signed and/or otherwise encrypted with a private key 312 to generate a digital signature 314 that is paired with the candidate trim data structure to generate a signed trim data structure 318. As described in further detail below, the private key 312 is paired with a corresponding public key 316.

In response to the authentication circuitry 206 detecting that a signed trim data structure 318 has been received by the device 100, the data structure integrator 106 invokes the example accelerator circuitry 114 to perform a hash using the hashing algorithm 308 to generate a second hash digest 320. Additionally, the accelerator circuitry 114 uses the public key 316 to decrypt the digital signature to generate a decrypted digital signature 322. The authentication circuitry 206 further invokes the accelerator circuitry 114 to compare the second hash digest 320 to the decrypted digital signature 322 to determine a match (324). In the event the match is successful, then the signed trim data structure 318 received by the device 100 is deemed safe and/or otherwise not tampered with. Alternatively, in the event the match is unsuccessful, then the received signed trim data structure 318 is not to be trusted and the example authentication circuitry 206 prevents any further use and/or processing of the signed trim data structure 318 received by the device 100.

Figure 4:
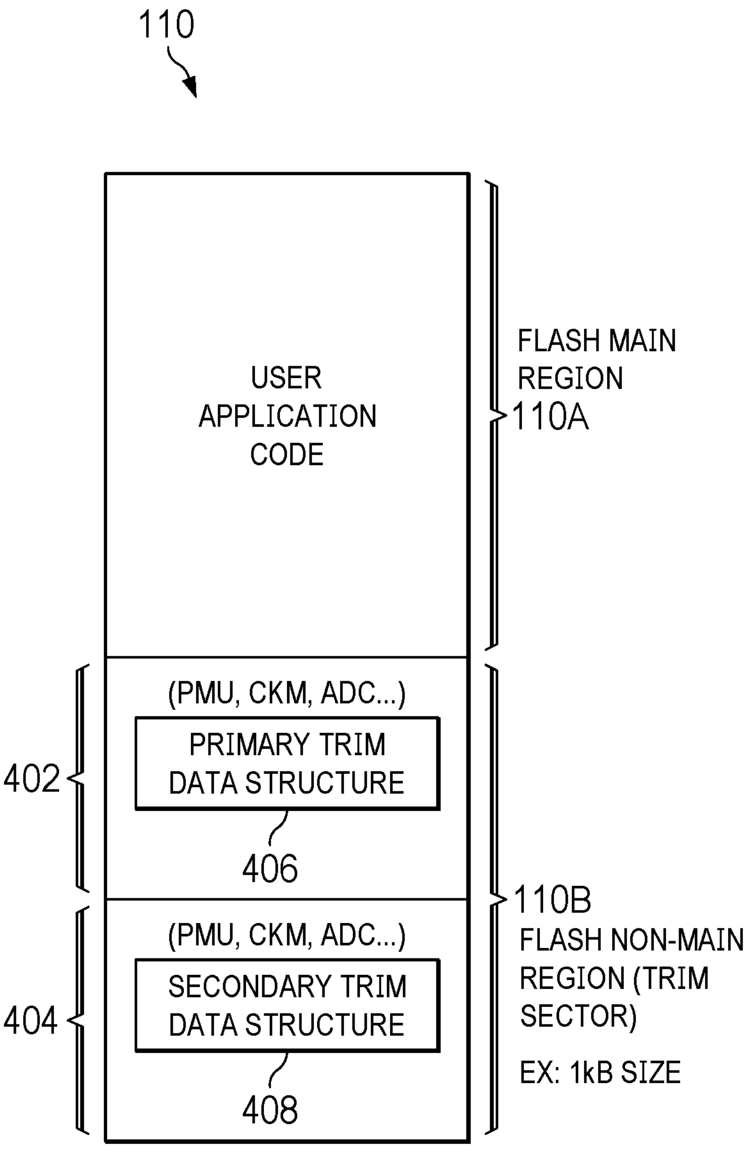
FIG. 4 is a block diagram of additional detail of non-volatile memory structure of FIG. 1.

FIG. 4 is a block diagram of additional detail corresponding to the non-volatile memory 110 of FIG. 1. In the illustrated example of FIG. 4, the non-volatile memory 110 includes the example main portion 110A and the example non-main portion 110B. The example non-main portion 110B includes a first sector 402 and a second sector 404. The example first sector includes a primary trim data structure 406 (or a primary trim value) that may have been stored on the memory 110 during manufacture of the device 100. The example second sector includes a secondary trim data structure 408 (or a new/subsequent trim value) that is requested to be used with the device at a second time after the time of device 100 manufacture.

In operation, initial trim values are set by the manufacturer of the device 100 prior to distribution to an end-user, such as an OEM. The initial trim values are stored as a primary trim data structure 406 in the first sector 402. However, in some examples the primary trim data structure 406 may be initially stored in the second sector 404, as described in further detail below. When the device 100 is powered on or experiences a reset condition, the example boot code 104 copies trim values from one of the first sector 402 or the second sector 404 into respective registers of the one or more peripherals 116 of the device 100. In some examples, the techniques of this disclosure may not significantly increase the size of the boot code stored in ROM 104 because the built-in self test routines can be called and utilized by the data structure integrator circuitry 106.

In the event the device 100 receives an alternate (e.g., new) trim data structure to be used by one or more peripherals, and in the event the received trim data structure and/or a request to update is successfully authenticated, the memory management circuitry 204 stores the trim data structure in the non-volatile memory 110 in a manner that also retains at least one prior version of the trim data structure. Generally speaking, while new trim data structures are authenticated and tested to confirm they will operate in a manner consistent with performance expectations, the possibility exists that prior versions of trim values might be helpful in the event one or more anomalies are discovered in connection with the new trim values. As such, examples described herein maintain at least one prior version of trim values that can be later retrieved in the event the updated trim values do not perform to expectations. Additionally, while the illustrated example of FIG. 4 includes a first sector 402 and a second sector 404 of the example memory 110, examples described herein are not limited thereto. For instance, any number of sectors may be used in a manner that allows more than one prior version of the trim values to be retained for future use, if needed. For instance, if the memory 110 has three or more sectors, then a second request to update a second trim value to a third trim value will permit two or more prior trim values (or trim data structures) to be stored in the memory 110 in case a rollback is needed and/or otherwise requested. As described herein, the techniques of this disclosure can allow for updating trim values more than once or twice.

In response to the memory management circuitry 204 detecting a trim data structure storage request, the memory management circuitry 204 determines whether an empty sector is available. For example, if the detected trim data structure storage request occurs after a newly manufactured device 100 is put into operation, the initial trim data structure is already stored in one of the two sectors, thereby leaving the other sector empty. If so, then the memory management circuitry 204 stores the newly received data structure in the empty sector. However, if both the first sector 402 and the second sector 404 are populated with at least one prior storage instance of a trim data structure, then the memory management circuitry 204 obtains a time and date metric (e.g., a timestamp, a storage timestamp, etc.) from the data structures that are stored in the first sector 402 and the second sector 404. The memory management circuitry 204 compares the timestamps (e.g., a storage timestamp comparison) to determine which one is the relatively oldest data structure and selects the corresponding sector to store the newly received trim data structure therein. Stated differently, examples described herein alternate and/or otherwise cycle a sector storage operation based on the oldest trim data, sometimes referred to as a ping-pong storage operation. Similarly, the example memory 110 of FIG. 4 having the first and second sectors is sometimes referred to herein as ping-pong memory.

While an example manner of implementing the data structure integrator circuitry 106 is illustrated in FIG. 1, one or more of the elements, processes, and/or devices illustrated in FIG. 1 may be combined, divided, re-arranged, omitted, eliminated, and/or implemented in any other way. Further, the example update detection circuitry 202, the example memory management circuitry 204, the example authentication circuitry 206, the example trim value verification circuitry 208, and/or, more generally, the example data structure integrator circuitry 106 of FIG. 1, may be implemented by hardware alone or by hardware in combination with software and/or firmware. Thus, for example, any of the example update detection circuitry 202, the example memory management circuitry 204, the example authentication circuitry 206, the example trim value verification circuitry 208, and/or, more generally, the example data structure integrator circuitry 106, could be implemented by programmable circuitry in combination with machine-readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s)), ASIC(s), programmable logic device (s) (PLD(s)), and/or field programmable logic device(s) (FPLD(s)) such as FPGAs. Further still, the example data structure integrator circuitry 106 of FIG. 1 may include one or more elements, processes, and/or devices in addition to, or instead of, those illustrated in FIG. 1, and/or may include more than one of any or all of the illustrated elements, processes and devices.

Figure 5A:
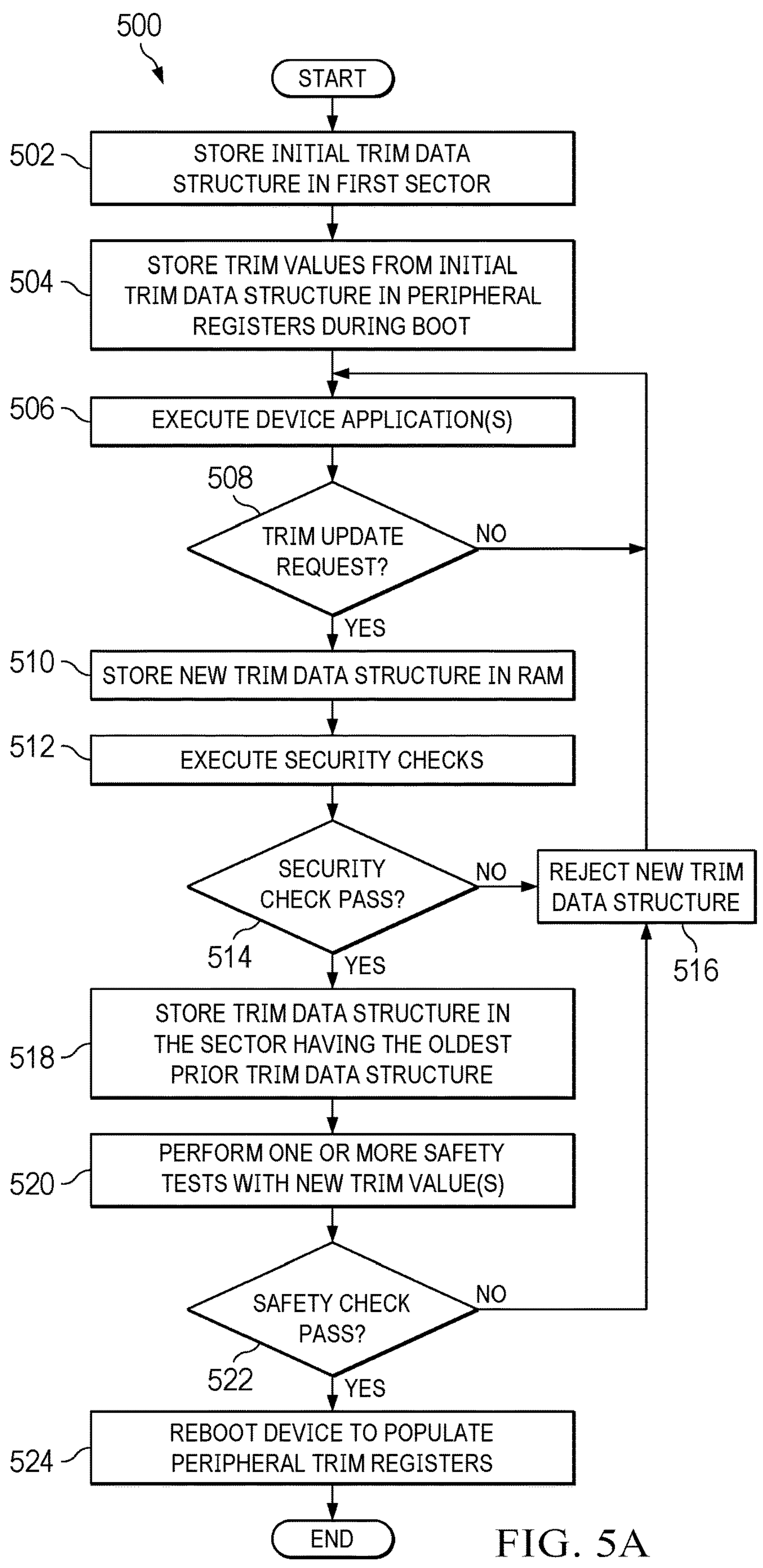
FIGS. 5A and 5B are flowcharts representative of example machine-readable instructions and/or example operations that may be executed, instantiated, and/or performed by example programmable circuitry to implement the data structure integrator circuitry 106 of FIG. 1.
Figure 5B:
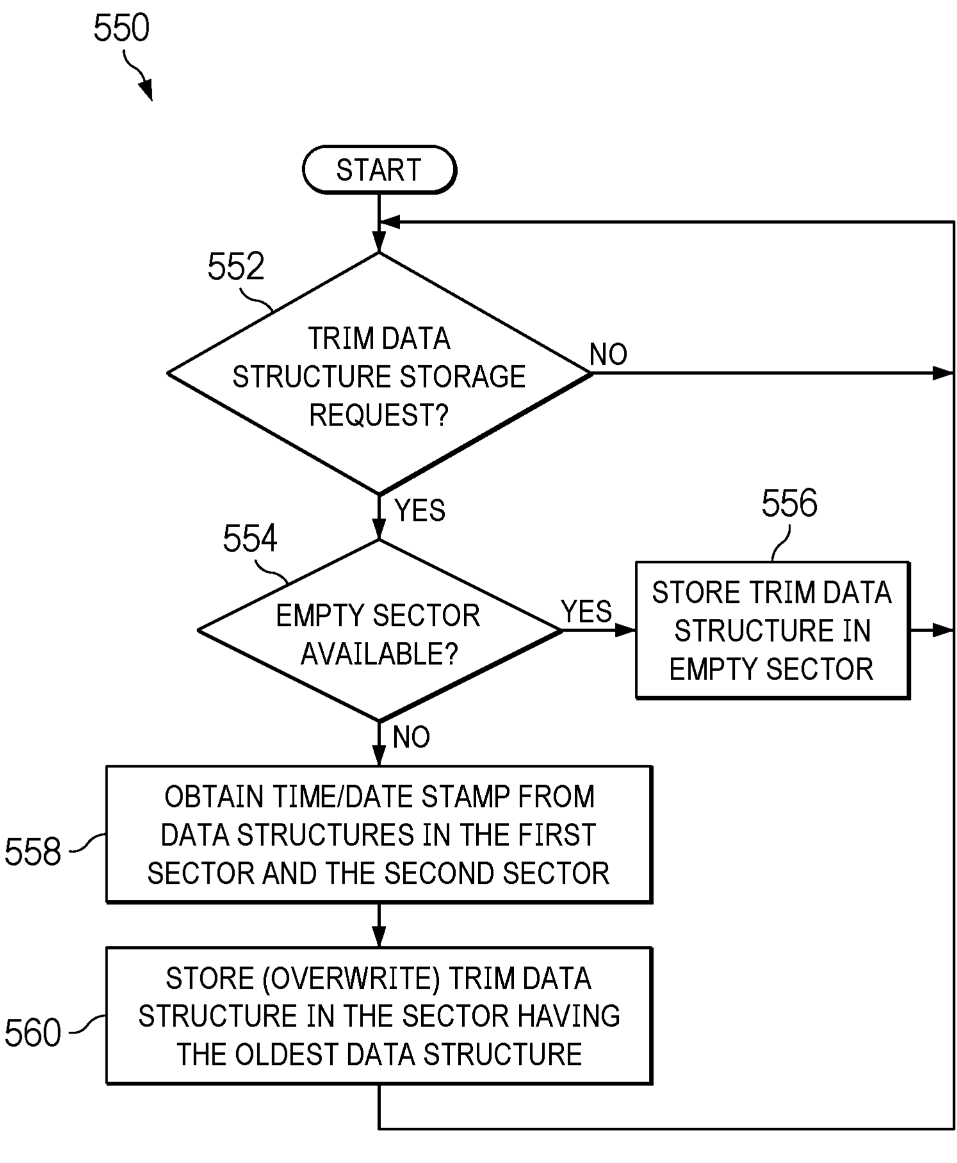

Flowchart(s) representative of example machine-readable instructions, which may be executed by programmable circuitry to implement and/or instantiate the data structure integrator circuitry 106 of FIG. 1 and/or representative of example operations which may be performed by programmable circuitry to implement and/or instantiate the data structure integrator circuitry 106 of FIG. 1, are shown in FIGS. 5A and 5B. The machine-readable instructions may be one or more executable programs or portion(s) of one or more executable programs for execution by programmable circuitry such as the programmable circuitry 612 shown in the example processor platform 600 discussed below in connection with FIG. 6. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 5A and 5B, many other methods of implementing the example data structure integrator circuitry 106 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API) (e.g., a trim update API instantiated by boot code in ROM), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5A and 5B may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

FIG. 5A is a flowchart representative of example machine-readable instructions and/or example operations 500 that may be executed, instantiated, and/or performed by programmable circuitry to update trim values of a device. The example machine-readable instructions and/or the example operations 500 of FIG. 5A begin at block 502, at which the memory management circuitry 204 stores an initial trim data structure in the first sector 402 of the memory 110. As described above, after device 100 manufacturing is complete an initial data structure is stored on the device 100 for use in the field. Additionally, the memory management circuitry 204 stores or causes storage of trim values from the initial data structure to registers of one or more peripherals 116 of the device 100 (block 504). In some examples, the device 100 is moved to an operating environment so that the one or more peripherals 116 may perform corresponding tasks.

During field operation, the example CPU 102 executes any number of applications (block 506) while the example update detection circuitry 202 determines whether a trim update request has been initiated, triggered and/or otherwise occurred (block 508). If not, control returns to block 506 and monitoring for such a trigger continues. However, in response to the update detection circuitry 202 determining and/or otherwise detecting a trigger that a trim update has been requested (block 508), the memory management circuitry 204 stores a new trim data structure in RAM 112 (block 510). Because the newly received trim data structure has not yet been authenticated, the authentication circuitry 206 executes one or more security checks (block 512) as described above. If the authentication circuitry 206 determines that the security check fails (block 514), then the newly received trim data structure is rejected (block 516). However, if the authentication circuitry 206 determines that the security check is successful (block 514), then the memory management circuitry 204 stores the new trim data structure in the sector of the memory 110 that is either empty or contains an oldest version of a prior trim data structure (block 518). As described above, the memory management circuitry 204 may, in some examples, store a newly received and successfully authenticated trim data structure in the first sector 402 in the event it contains an oldest version of a prior trim data structure, or the second sector 404 in the event it contains the oldest version. Additionally, in some examples more than two sectors are available for trim data structure storage, which facilitates an ability to have a greater number of prior trim data structures stored on the memory.

The example trim value verification circuitry 208 performs one or more safety tests with one or more of the trim values from the newly received trim data structure (block 520). If the tested trim value(s) do not pass a safety check (block 522) (e.g., one or more threshold values are not satisfied), then the trim data structure is rejected (block 516). In such circumstances, the prior version of the trim data structure and trim values therein is maintained for use with the device 100. However, in the event the one or more tested trim values satisfy one or more safety checks (block 522), then the example data structure integrator 106 reboots the device 100 to populate peripheral trim registers with trim values from the newly received trim data structure (block 524). Thus, the trim value verification circuitry 208 can ensure the authenticity and integrity of the newly received trim data, rather than blindly copying the new trim data.

FIG. 5B is a flowchart representative of example machine-readable instructions and/or example operations 550 that may be executed, instantiated, and/or performed by programmable circuitry to store received trim data structures in the memory 110 after such trim data structures have been successfully authenticated. In the illustrated example of FIG. 5B, the memory management circuitry 204 monitors for the occurrence of a trim data structure storage request (block 552). If the memory management circuitry 204 determines and/or otherwise detects that one of the memory sectors is empty (block 554), then the trim data structure is stored in that previously empty sector (block 556). However, if none of the sectors of the memory 110 are empty, then the memory management circuitry 204 obtains time and date information (e.g., a timestamp) from data structures in all available sectors of the memory 110 (block 558). Based on the sector of the memory 110 containing the oldest relative timestamp, the memory management circuitry 204 overwrites the contents of that sector with the newly received trim data structure (block 560). Control then returns to block 552 to continue monitoring for storage requests.

Figure 6:
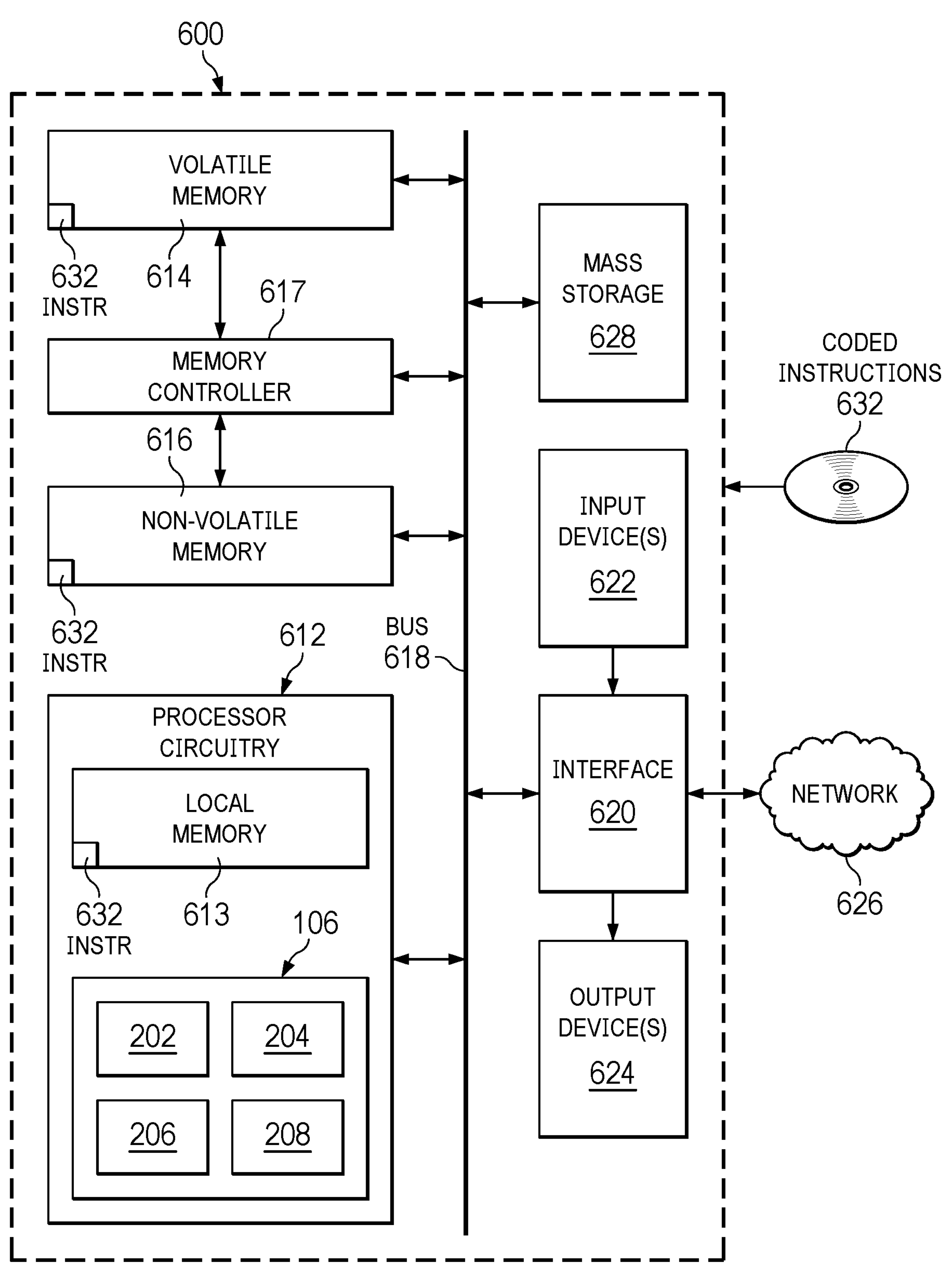
FIG. 6 is a block diagram of an example processing platform including programmable circuitry structured to execute, instantiate, and/or perform the example machine-readable instructions and/or perform the example operations of FIGS. 5A and 5B to implement the data structure integrator circuitry 106 of FIG. 1.

FIG. 6 is a block diagram of an example programmable circuitry platform 600 structured to execute and/or instantiate the example machine-readable instructions and/or the example operations of FIGS. 5A and 5B to implement the data structure integrator circuitry 106 of FIG. 1. The programmable circuitry platform 600 can be, for example, a server, a personal computer, a workstation, a self-learning machine (e.g., a neural network), a mobile device (e.g., a cell phone, a smart phone, a tablet such as an iPad™), an Internet appliance, a gaming console, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the update detection circuitry 202, the memory management circuitry 204, the authentication circuitry 206, the trim value verification circuitry, and the data structure integrator 106.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 632, which may be implemented by the machine-readable instructions of FIGS. 5A and 5B, may be stored in the mass storage device 628, in the volatile memory 614, in the non-volatile memory 616, and/or on at least one non-transitory computer readable storage medium such as a CD or DVD which may be removable.

In some examples, the programmable circuitry 612 of FIG. 6 may be in one or more packages. In some examples, an XPU may be implemented by the programmable circuitry 612 of FIG. 6, which may be in one or more packages.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time of +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms “terminal,” “node,” “interconnection,” “pin” and “lead” are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term “integrated circuit” means one or more circuits that are: (i) incorporated in/over a semiconductor substrate; (ii) incorporated in a single semiconductor package; (iii) incorporated into the same module; and/or (iv) incorporated in/on the same printed circuit board.

Modifications are possible in the described embodiments, and other embodiments are possible, within the scope of the claims.

Example methods, apparatus, systems, and articles of manufacture to update trim values of a device are disclosed herein. Further examples and combinations thereof include the following:

Example 1 includes a device comprising instructions, and programmable circuitry configurable to at least one of instantiate or execute the instructions to authenticate a request to update a first trim value to a second trim value, wherein the first trim value is stored in a memory, and in response to authentication of the request, store the second trim value to the memory while the first trim value remains stored in the memory.

Example 2 includes the device of example 1, wherein the request is a first request, the programmable circuitry is further configurable to authenticate a second request to update the second trim value to a third trim value, and in response to authentication of the second request, store the third trim value to the memory while the second trim value remains stored in the memory.

Example 3 includes the device of example 2, wherein the programmable circuitry is further configurable to overwrite the first trim value with the third trim value.

Example 4 includes the device of example 1, wherein the programmable circuitry is further configurable to test the second trim value on the device.

Example 5 includes the device of example 4, wherein the programmable circuitry is further configurable to, in response to the test satisfying target metrics, authorize usage of the second trim value.

Example 6 includes the device of example 4, wherein the programmable circuitry is further configurable to, in response to the test satisfying target metrics, store the second trim value in one of a first sector of the memory or a second sector of the memory.

Example 7 includes the device of example 1, wherein the programmable circuitry is further configurable to determine which one of a first sector of the memory or a second sector of the memory includes the first trim value.

Example 8 includes the device of example 7, wherein the programmable circuitry is further configurable to overwrite one of the first sector or the second sector based on a storage timestamp comparison.

Example 9 includes the device of example 8, wherein the programmable circuitry is further configurable to overwrite the one of the first sector or the second sector that corresponds to a respective oldest storage timestamp.

Example 10 includes the device of example 1, wherein the first trim value was generated at a first time during manufacture of the device.

Example 11 includes the device of example 10, wherein the programmable circuitry is further configurable to receive the second trim value at a second time after installation of the device.

Example 12 includes the device of example 11, wherein the programmable circuitry is further configurable to activate the second trim value for use with the device, and deactivate the first trim value from being used by the device.

Example 13 includes the device of example 1, wherein the device includes at least one of a power amplifier, a low noise amplifier, a direct-current to direct-current (DCDC) converter, an oscillator, or an analog-to-digital converter (ADC).

Example 14 includes a non-transitory computer-readable medium comprising machine-readable instructions that, when executed, cause processor circuitry to, at least authenticate a first request corresponding to replacing a first trim value with a second trim value, wherein the first trim value is stored in a memory, and in response to authentication of the first request store the second trim value to the memory, and maintain the first trim value in the memory.

Example 15 includes the non-transitory computer-readable medium of example 14, wherein the machine-readable instructions cause the processor circuitry to authenticate a second request corresponding to replacing the second trim value with a third trim value, and in response to authentication of the second request store the third trim value to the memory, and maintain the second trim value in the memory.

Example 16 includes the non-transitory computer-readable medium of example 15, wherein the machine-readable instructions cause the processor circuitry to overwrite the first trim value with the third trim value.

Example 17 includes the non-transitory computer-readable medium of example 15, wherein the machine-readable instructions cause the processor circuitry to test the second trim value on a device.

Example 18 includes the non-transitory computer-readable medium of example 17, wherein the machine-readable instructions cause the processor circuitry to authorize usage of the second trim value in response to the test satisfying one or more target metrics.

Example 19 includes the non-transitory computer-readable medium of example 17, wherein the machine-readable instructions cause the processor circuitry to store the second trim value in one of a first sector of the memory or a second sector of the memory in response to the test satisfying one or more target metrics, the first and second sectors of the memory forming a ping-pong memory.

Example 20 includes the non-transitory computer-readable medium of example 15, wherein the machine-readable instructions cause the processor circuitry to determine which one of a first sector of the memory or a second sector of the memory includes the first trim value.

Example 21 includes the non-transitory computer-readable medium of example 20, wherein the machine-readable instructions cause the processor circuitry to overwrite one of the first sector or the second sector of the memory based on a storage timestamp comparison.

Example 22 includes the non-transitory computer-readable medium of example 21, wherein the machine-readable instructions cause the processor circuitry to overwrite the one of the first sector or the second sector that corresponds to a respective oldest storage timestamp.

Example 23 includes the non-transitory computer-readable medium of example 15, wherein the machine-readable instructions cause the processor circuitry to enable device usage of the second trim value, and disable device usage of the first trim value.

Example 24 includes a method comprising authenticating a request to update a first trim value to a second trim value, wherein the first trim value is stored in a memory, and in response to authentication of the request, store the second trim value to the memory while the first trim value remains stored in the memory.

Example 25 includes the method of example 24, further including authenticating a second request to update the second trim value to a third trim value, and in response to authentication of the second request, storing the third trim value to the memory while the second trim value remains stored in the memory.

Example 26 includes the method of example 25, further including overwriting the first trim value with the third trim value.

Example 27 includes the method of example 24, further including testing a device based on the second trim value.

Example 28 includes the method of example 27, further including authorizing usage of the second trim value with the device in response to the test satisfying one or more target metrics.

Example 29 includes the method of example 27, further including storing the second trim value in one of a first sector of the memory or a second sector of the memory in response to the test satisfying one or more target metrics.

Example 30 includes the method of example 24, further including determining which one of a first sector of the memory or a second sector of the memory includes the first trim value.

Example 31 includes the method of example 30, further including overwriting one of the first sector or the second sector based on a storage timestamp comparison.

Example 32 includes the method of example 31, further including overwriting the one of the first sector or the second sector that corresponds to a respective oldest storage timestamp value.

From the foregoing, it will be appreciated that example systems, apparatus, articles of manufacture, and methods have been described that enable peripheral operations to be updated and/or tailored while in the field, particularly in circumstances where initial field environmental conditions have changed (e.g., unexpectedly) after an initial installation or deployment of the peripherals. For instance, RF power output values of a transmitter may have appropriate trim values at a first time after initial deployment of an SoC that includes one or more power amplifiers, but in the event the SoC is located to an alternate position at a subsequent time, such RF power output values may no longer result in acceptable performance of the power amplifier(s). As such, examples described herein facilitate a manner of updating trim values to the peripherals so that acceptable (e.g., operating metrics within threshold values) peripheral operation may occur. In some examples, if an RF transmitter has trim values that are too high, then power is wasted and corresponding RF receivers may become saturated. Accordingly, described systems, apparatus, articles of manufacture, and methods improve the efficiency of using a device by facilitating power conservation trim settings after one or more peripherals of a device are deployed in the field. Described systems, apparatus, articles of manufacture, and methods are accordingly directed to one or more improvement(s) in the operation of a machine such as a computer or other electronic and/or mechanical device.

What is claimed is:

1. A device comprising:
- a first memory to store instructions; and
- programmable circuitry coupled to the first memory and configurable to at least one of instantiate or execute the instructions to:
  - authenticate a request to update a first trim value to a second trim value, wherein the first trim value is stored in a second memory before the device is deployed in an operating environment, and wherein the second trim value is retrieved via a first wireless transmission associated with a trim value change request received while the device is deployed in the operating environment; and
  - in response to authentication of the request, store the second trim value to the second memory while the first trim value remains stored in the second memory.

2. The device of claim 1, wherein the request is a first request, the programmable circuitry is further configurable to:
- authenticate a second request to update the second trim value to a third trim value, the third trim value retrieved via a second wireless transmission; and
- in response to authentication of the second request, store the third trim value to the second memory while the second trim value remains stored in the second memory.

3. The device of claim 2, wherein the programmable circuitry is further configurable to, based on the authentication of the second request, overwrite the first trim value with the third trim value.

4. The device of claim 1, wherein the programmable circuitry is further configurable to, based on an indication of authentication associated with the second trim value, test the second trim value on the device.

5. The device of claim 4, wherein the programmable circuitry is further configurable to, in response to the test satisfying target metrics corresponding to device operation, authorize usage of the second trim value.

6. The device of claim 4, wherein the programmable circuitry is further configurable to, in response to the test satisfying target metrics corresponding to device operation, store the second trim value in one of a first sector of the second memory or a second sector of the second memory.

7. The device of claim 1, wherein the programmable circuitry is further configurable to determine which one of a first sector of the second memory or a second sector of the second memory includes the first trim value.

8. The device of claim 7, wherein the programmable circuitry is further configurable to overwrite one of the first sector or the second sector based on a comparison of storage timestamps.

9. The device of claim 8, wherein the programmable circuitry is further configurable to overwrite the one of the first sector or the second sector that corresponds to a respective oldest one of the storage timestamps.

10. The device of claim 1, wherein the first trim value was generated at a first time, the first time occurring during manufacture or assembly of the device.

11. The device of claim 10, wherein the programmable circuitry is further configurable to receive the second trim value at a second time after the first time, the second time occurring after installation of the device.

12. The device of claim 11, wherein the programmable circuitry is further configurable to:
- activate the second trim value for use with the device; and
- deactivate the first trim value from being used by the device.

13. The device of claim 1, wherein the device includes at least one of a power amplifier, a low noise amplifier, a direct-current to direct-current (DCDC) converter, an oscillator, or an analog-to-digital converter (ADC).

14. A non-transitory computer-readable medium comprising machine-readable instructions that, when executed, cause processor circuitry to, at least:
- authenticate a first request corresponding to replacing a first trim value with a second trim value, wherein the first trim value is stored in a memory before the memory is deployed in an operating environment, and wherein the second trim value is retrieved via a first wireless transmission associated with a trim value change request received while the memory is deployed in the operating environment; and
- in response to authentication of the first request:
  - store the second trim value to the memory; and
  - maintain the first trim value in the memory.

15. The non-transitory computer-readable medium of claim 14, wherein the machine-readable instructions cause the processor circuitry to:
- authenticate a second request corresponding to replacing the second trim value with a third trim value, the third trim value retrieved via a second wireless transmission; and
- in response to authentication of the second request:
  - store the third trim value to the memory; and
  - maintain the second trim value in the memory.

16. The non-transitory computer-readable medium of claim 15, wherein the machine-readable instructions cause the processor circuitry to, based on the authentication of the second request, overwrite the first trim value with the third trim value.

17. The non-transitory computer-readable medium of claim 15, wherein the machine-readable instructions cause the processor circuitry to, based on an indication of authentication associated with the second trim value, test the second trim value on a device.

18. The non-transitory computer-readable medium of claim 17, wherein the machine-readable instructions cause the processor circuitry to authorize usage of the second trim value in response to the test satisfying one or more target metrics corresponding to device operation.

19. The non-transitory computer-readable medium of claim 17, wherein the machine-readable instructions cause the processor circuitry to store the second trim value in one of a first sector of the memory or a second sector of the memory in response to the test satisfying one or more target metrics corresponding to device operation, the first and second sectors of the memory forming a ping-pong memory.

20. A method comprising:
- authenticating a request to update a first trim value to a second trim value, wherein the first trim value is stored in a memory before the memory is deployed in an operating environment, and wherein the second trim value is retrieved via a first wireless transmission associated with a trim value change request received while a device is deployed in the operating environment; and
- in response to authentication of the request, store the second trim value to the memory while the first trim value remains stored in the memory.

* * * * *